(No Model.)
L. B. ROGERS.
WABBLE SAW.
No. 425,700. Patented Apr. 15, 1890.
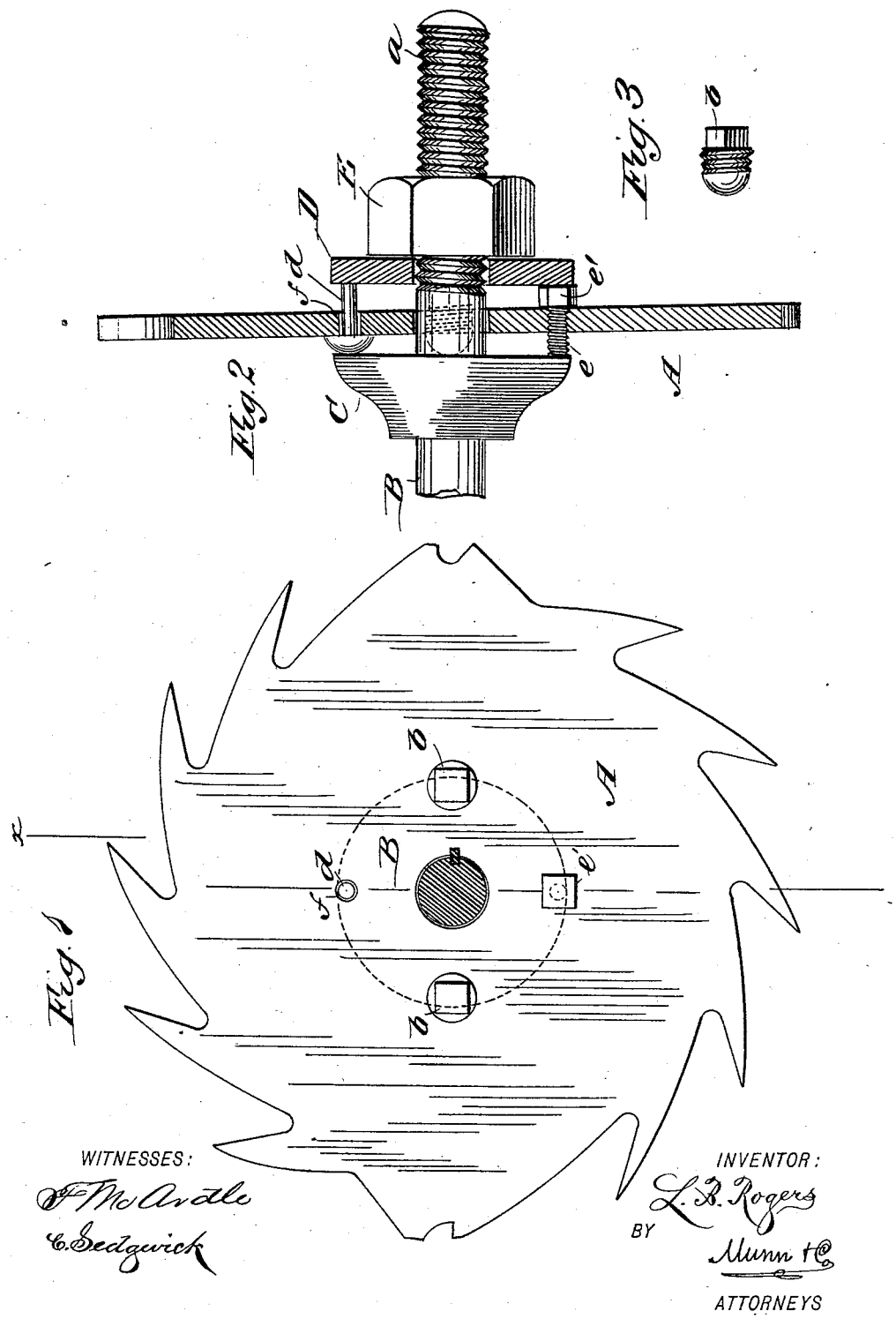
WITNESSES:
F. McArdle
E. Sedgwick
INVENTOR:
L. B. Rogers
BY
Munn & Co.
ATTORNEYS

UNITED STATES PATENT OFFICE.

LEWIS B. ROGERS, OF MOUNT VERNON, NEW YORK.

WABBLE-SAW.

SPECIFICATION forming part of Letters Patent No. 425,700, dated April 15, 1890.

Application filed January 25, 1890. Serial No. 338,072. (No model.)

*To all whom it may concern:*

Be it known that I, LEWIS B. ROGERS, of Mount Vernon, in the county of Westchester and State of New York, have invented a new and Improved Wabble-Saw, of which the following is a full, clear, and exact description.

My invention relates to improvements in wabble-saws, or more especially in the means by which said saws may be fixed at any desired angle.

The attachments heretofore in use for changing the position or angle of wabble-saws and fixing them in position, while working fairly well, have been comparatively expensive; and the object of my invention is to provide a cheap and efficient device by means of which the angle of the saw may be quickly changed and fixed.

To this end my invention consists in a saw mounted in the usual way upon a mandrel between two collars, and having two diametrically-opposite bolts of equal length fixed thereto so that their ends will bear upon the collars, and two diametrically-opposite bolts at right angles with said fixed bolts, one of which fits loosely in a hole in the saw-plate and bears against the adjoining collars, and the other of which is screw-threaded and fits a corresponding thread in the saw-plate, and by means of which the saw is adjusted. This construction will be hereinafter fully described, and specifically pointed out in the claims.

Reference is to be had to the accompanying drawings, forming a part of this specification, in which similar letters of reference indicate corresponding parts in all the figures.

Figure 1 is a side elevation of a saw provided with my invention, with the collar removed; Fig. 2, a vertical cross-section of the same on the line $x\ x$ of Fig. 1, and Fig. 3 a detailed view of one of the bolts that are fixed to the saw-plate.

The saw A, which is like an ordinary wabble-saw, is mounted in the usual manner upon a mandrel B, which has a collar C fixed thereto. The end of the mandrel is provided with a screw-thread $a$, which extends nearly to the saw, with a washer or collar D, which is of about the same diameter as the collar C, and with a nut E, which fits the thread $a$, and by means of which the washer D is held in position.

Fixed in the saw-plate so as to project through the same an equal distance on each side are the bolts $b$, which are screwed into the saw-plate, but may be attached thereto in any suitable manner, and which are placed diametrically opposite each other and project from the saw A in such a manner that they will bear against the collar C and washer D, near the outer edges thereof, and as these bolts are opposite each other, as described, they will act as a pivot at the points where they bear against the collar and washer, upon which the saw may be tilted. At right angles with the bolts $b$ and at about the same distance from the center of the saw are the diametrically-opposite bolts $d$ and $e$, which project through the saw-plate and are of equal length, and are also of the same length as the bolts $b$. The bolt $d$ may be of any suitable shape or may be a simple pin. It fits loosely in a hole $f$ in the saw-plate, and its ends bear against the collar C and washer D. The bolt $e$ likewise passes through the saw-plate, and is provided with a screw-thread, which fits a corresponding thread in the saw-plate, and is provided with a suitable flat-sided head $e'$, to which a wrench may be applied. By means of this bolt the angle of the saw may be easily changed.

The device is operated as follows: The saw A is placed upon the mandrel B, with the bolts $b\ b$, $d$, and $e$ in position therein, the washer D placed in position upon the mandrel, and the nut E screwed firmly against the washer, so that the washer will be forced against the ends of said bolts. The bolts will thus all bear firmly against the collar D and washer C and hold the saw in position. To change the angle of the saw, the bolt $e$ is turned, and as the bolt cannot move longitudinally by reason of the collar and washer at each end thereof it will cause the saw to move thereon. The bolts $b$ will act as a pivot, and as the bolt $d$ fits loosely in the saw-plate one side of the saw will slide upon said bolt in the opposite direction to which the other side is moved by the bolt $e$, and as the bolts are all of the same length they will all bear against the collar D and washer C in whatever position the saw may be placed, and will act as braces for the same. It will thus be seen that the angle of the saw may be changed and the saw held in position by simply turning the bolt *e*.

Having thus described my invention, what I claim as new, and desire to secure by Letters Patent, is—

1. A wabble-saw having two diametrically-opposite bolts fixed in the plate thereof so as to bear against adjoining collars, a bolt placed loosely in the plate thereof at right angles with said fixed bolts, and a threaded bolt fitting a corresponding thread in the saw-plate and placed diametrically opposite said loose bolt, and adapted to fit against adjoining collars, so that the angle of the saw may be thereby regulated, substantially as described.

2. A wabble-saw having the plate thereof provided with four bolts of equal length, placed at right angles with each other and at equal distances from the saw-center, two opposite bolts thereof being fixed and extending an equal distance from each side of the saw, one of the other bolts being placed loosely in a hole in the saw-plate and the opposite bolt being provided with a screw-thread fitting a corresponding thread in the saw-plate, substantially as described, and for the purpose specified.

3. The combination, with the saw A, having the bolts *b b* fixed thereto, and the collar C and washer D, mounted upon a mandrel or shaft at each side thereof, of the bolt *d*, placed loosely in the hole *f* of the saw, with its ends bearing against said washer and collar, and the threaded bolt *e*, fitting a corresponding thread in the saw-plate and adapted, as shown, to change the angle of the same, substantially as described.

4. The combination, with a mandrel, a fixed collar, and a loose collar, of a saw having opposite pivots at diametrically-opposite points, a pin passing loosely through the saw, and a threaded bolt engaging the saw at a point diametrically opposite said pin, substantially as shown and described.

LEWIS B. ROGERS.

Witnesses:
   EDWIN HAYERADT,
   NATHL. EATON.